United States Patent
Ai et al.

(10) Patent No.: US 7,960,888 B2
(45) Date of Patent: Jun. 14, 2011

(54) ELECTRIC MOTOR WITH FIELD WEAKENING

(75) Inventors: Xiaolan Ai, Massillon, OH (US); Bradley Mularcik, Copley, OH (US); Richard Knepper, North Canton, OH (US)

(73) Assignee: The Timken Company, Canton, OH (US)

( * ) Notice: Subject to any disclaimer, the term of this patent is extended or adjusted under 35 U.S.C. 154(b) by 255 days.

(21) Appl. No.: 12/095,356

(22) PCT Filed: Feb. 12, 2007

(86) PCT No.: PCT/US2007/003838
§ 371 (c)(1),
(2), (4) Date: Oct. 20, 2008

(87) PCT Pub. No.: WO2007/095254
PCT Pub. Date: Aug. 23, 2007

(65) Prior Publication Data
US 2009/0127963 A1    May 21, 2009

Related U.S. Application Data

(60) Provisional application No. 60/772,208, filed on Feb. 10, 2006.

(51) Int. Cl.
*H02K 1/00*    (2006.01)
*H02K 23/46*    (2006.01)
(52) U.S. Cl. .................. 310/190; 310/191; 310/192
(58) Field of Classification Search .................. 310/190, 310/191, 192
See application file for complete search history.

(56) References Cited

U.S. PATENT DOCUMENTS

| | | | | |
|---|---|---|---|---|
| 2,490,789 A | * | 12/1949 | Ellis | 310/103 |
| 3,001,093 A | * | 9/1961 | Wilcox et al. | 310/158 |
| 3,483,411 A | * | 12/1969 | Shigeyuki et al. | 310/162 |

(Continued)

FOREIGN PATENT DOCUMENTS

EP      1035635 A2      9/2000
(Continued)

OTHER PUBLICATIONS

Nipp, Eckart "Alternative to Field-Weakening of Surface-Mounted Permanent-Magnet Motors For Variable-Speed Drives", Royal Institute of Technology, EKC, S-100 44 Stockholm, Sweden, IEEE (1995) pp. 191-198.

*Primary Examiner* — Quyen Leung
*Assistant Examiner* — Alex W Mok
(74) *Attorney, Agent, or Firm* — Polster, Lieder, Woodruff & Lucchesi, L.C.

(57) ABSTRACT

An electric motor comprising a rotor, a stator and a field weakening device. The rotor has a plurality of magnets mounted thereto, and the stator is located adjacent to the rotor and has a plurality of slots defined therein. The slots define raised teeth and are wound with electrical wiring to generate a magnetic field when the wiring is energized with current. The field weakening device is made from a highly magnetically permeable material and a comparatively lower magnetically permeable material. The field weakening device is disposed between the rotor and the stator and is selectively movable between a first position to align the highly magnetically permeable material between the teeth of the stator and the magnets of the rotor and a second position to align the comparatively lower magnetically permeable material between the teeth of the stator and the magnets of the rotor.

17 Claims, 10 Drawing Sheets

U.S. PATENT DOCUMENTS

| | | | |
|---|---|---|---|
| 3,822,390 A * | 7/1974 | Janson | 310/104 |
| 4,027,229 A | 5/1977 | Frink | |
| 4,710,667 A | 12/1987 | Whiteley | |
| 6,137,203 A | 10/2000 | Jermakian et al. | |
| 6,194,802 B1 | 2/2001 | Rao | |
| 6,348,751 B1 | 2/2002 | Jermakian et al. | |
| 6,700,242 B2 * | 3/2004 | Kawamura | 310/68 R |
| 2004/0070307 A1 | 4/2004 | Haygan | |

FOREIGN PATENT DOCUMENTS

| | | |
|---|---|---|
| EP | 1220427 A2 | 7/2002 |
| EP | 1220427 A3 | 6/2006 |
| FR | 1534007 | 7/1968 |
| JP | 2003092899 A * | 3/2003 |

* cited by examiner

ELECTRIC MOTOR WITH FIELD WEAKENING

RELATED APPLICATIONS

The present application is the United States National Stage under 35 U.S.C. §371 of International Application Serial No. PCT/US2007/003838 having an International Filing Date of Feb. 12, 2007, and is related to and claims priority to U.S. Provisional Patent Application No. 60/722,208, filed Feb. 10, 2006, the contents of both of which are incorporated herein by reference.

FIELD OF THE INVENTION

The invention relates to electric motors. More specifically, the invention relates to an apparatus for selectively weakening the field strength of an electric motor by alternately placing a high magnetic permeability material in the air gap between the rotor and the stator of the motor and a less magnetic permeable material in the air gap between the rotor and the stator of the motor.

BACKGROUND OF THE INVENTION

Permanent magnet motors have a trade off between having high torque at low speed and having a high speed range. Specifically, if the motor is built such that large amounts of low end torque are produced, the top speed of the motor is reduced. If a high top speed is required, this must come at the expense of low end torque.

For applications such as use in an electrically-powered automobile, it is desirable to have both high torque at low speed and a high top speed of the motor to avoid the necessity for a transmission assembly, which increases cost and complexity, to increase the speed range of the motor and still provide enough torque to accelerate the automobile at an acceptable rate.

Several methods exist presently to address this limitation. However, all are based on reducing the flux density in the stator core. One method of reducing the flux density in the stator core is to vary the air gap between the rotor and stator to alter the flux density in the stator. This method requires complex mechanical assemblies that allow the rotor and stator to change position with respect to one another. For example, in an axial flux electric motor, a mechanical assembly would be required to physically move the rotor and stator axially with respect to one another.

Another method of reducing flux density in the stator core is to introduce currents into the stator that create magnetic fields to oppose the magnetic fields of the permanent magnets on the stator. This has the obvious limitation of reducing the efficiency of the motor. In many applications, such as an electrically-powered automobile, this may not be desirable.

SUMMARY OF THE INVENTION

The present invention provides an electric motor comprising a rotor, a stator and a field weakening device. The rotor has a plurality of magnets mounted thereto, and the stator is located adjacent to the rotor and has a plurality of slots defined therein. The slots define raised teeth and are wound with electrical wiring to generate a magnetic field when the wiring is energized with current. The field weakening device is made from a highly magnetically permeable material and a comparatively lower magnetically permeable material. The field weakening device is disposed between the rotor and the stator and is selectively movable between a first position to align the highly magnetically permeable material between the teeth of the stator and the magnets of the rotor and a second position to align the comparatively lower magnetically permeable material between the teeth of the stator and the magnets of the rotor.

DESCRIPTION OF THE PREFERRED EMBODIMENT

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

In its preferred embodiment, the present invention provides an electric motor having an effective means for magnetic field weakening to allow the motor to operate at elevated speeds without sacrificing torque at low motor speeds, thereby extending speed coverage under constant power. The preferred embodiment of the present invention provides this benefit without a complex mechanical assembly or reducing efficiency by introducing current into the stator to oppose the magnetic forces of rotor.

Figure 1:
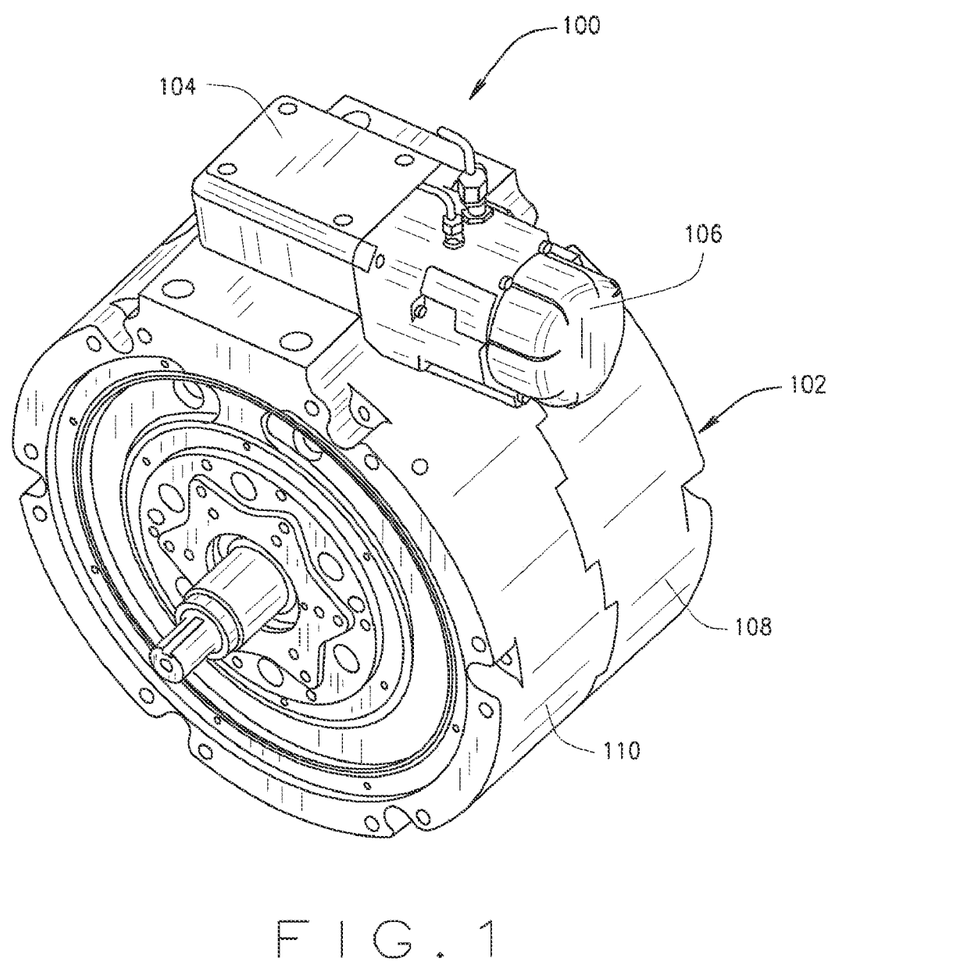
FIG. 1 is a front perspective view of an electric motor in accordance with a preferred embodiment of the present invention.

Referring to FIG. 1, a motor 100 with field weakening according to a preferred embodiment of the present invention is provided. The motor 100 generally comprises an axial flux drive 102, an actuator drive train 104 and an actuator 106. While the drive 102 in the present embodiment is described as an axial flux drive, it would be within the skill of one of ordinary skill in the art to apply the principles of the present invention to a radial flux drive. Moreover, while the invention is described with respect to an axial flux motor with a two stators, one of ordinary skill in the art would readily recognize that the principles of this invention apply with equal effectiveness to a single stator axial flux motor.

The actuator 106 is selectively operated in order to operate the field weakening drive train 104 to weaken the field of the motor 100, as described below. When the field is not weakened, the motor 100 has high torque characteristics at low speeds. When the field is weakened, the motor 100 has a wide speed range.

Figure 8:
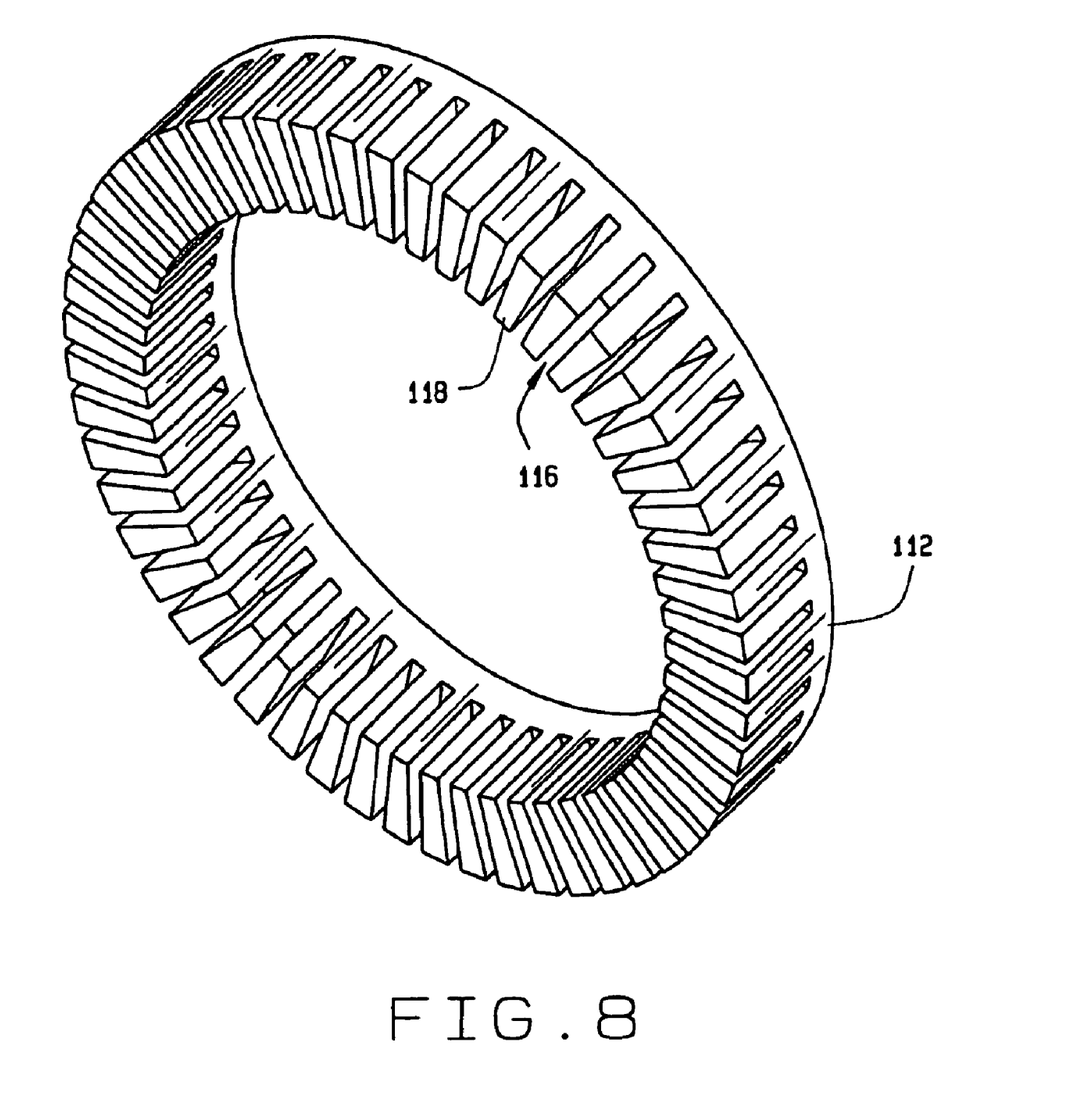
FIG. 8 is a perspective view of a stator of an electric motor in accordance with a preferred embodiment of the present invention.

FIGS. 2-5 provide various views of the motor 100 according to an embodiment of the present invention. Turning to those Figs., the axial flux drive 102 comprises a first and second motor housing 108 and 110. The motor housings 108 and 110 comprise first and second stators 112 and 114, respectively. As is known in the art in the construction of axial flux electric motors, the first stator 112 and the second stator 114 comprise iron cores wound with electrical wiring through slots 116 formed in the stators 112 and 114. The slots 116 of the stators 112 and 114 define teeth 118 (see FIG. 8). For purposes of clarity, the wire winding of the stators 112 and 114 is not shown. The stators 112 and 114 are fixed to the motor housings 108 and 110 through mechanical means, such as fasteners.

Figure 6:
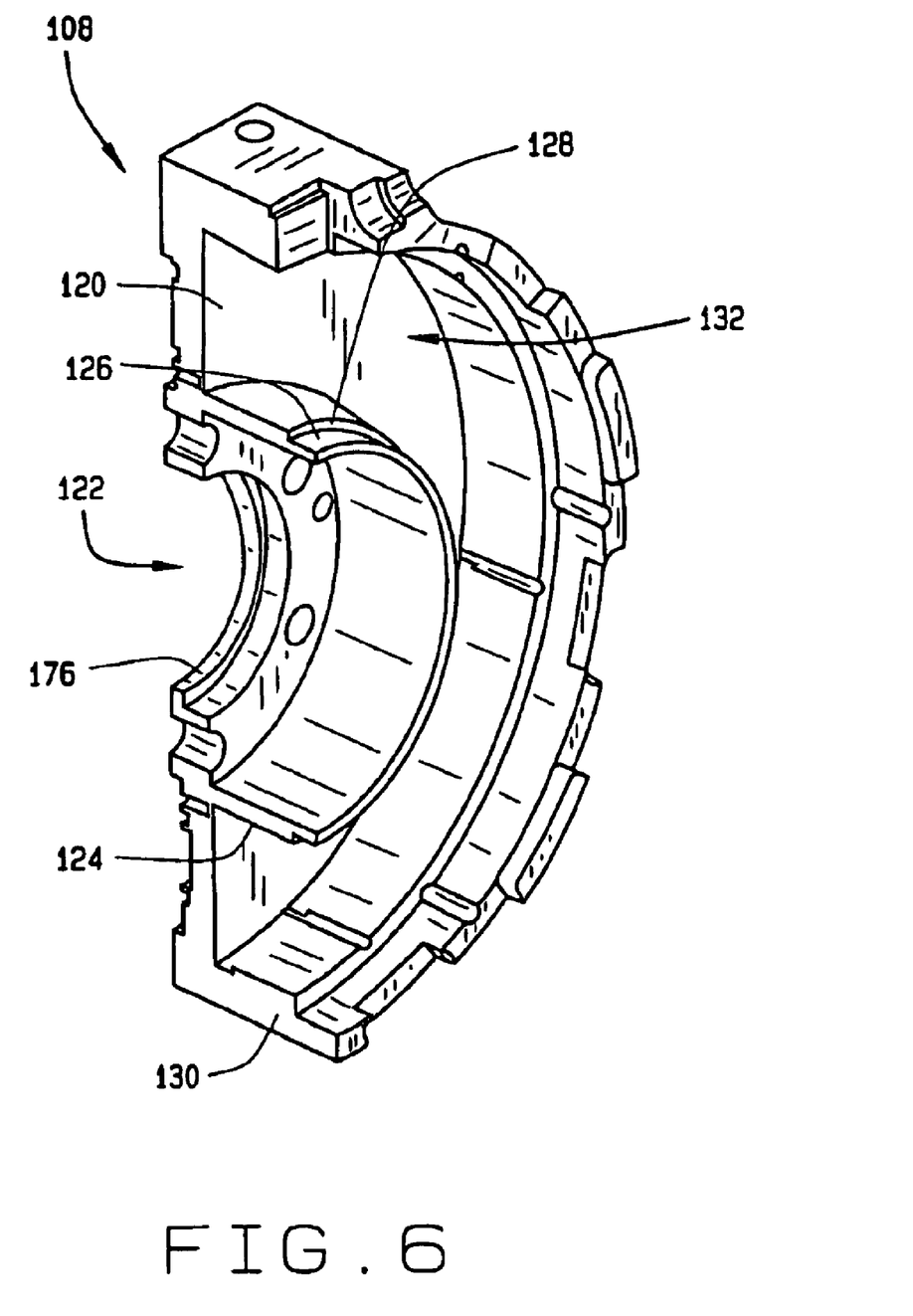
FIG. 6 is a perspective cutaway view of a motor housing of an electric motor in accordance with a preferred embodiment of the present invention.

As shown in FIG. 6, the motor housing 108 comprises an outer wall 120 having a central bore 122. About the central bore 122, the motor housing 108 comprises a first annular extension 124 defining a disc bearing surface 126 and a disc bearing stop wall 128. A second annular extension 130 extends from an outer periphery of the outer wall 120. The second annular extension 130 and the first annular extension 124 together define a recess 132 into which the stator 112 or 114 may be mounted. The motor housing 110 is similarly constructed to motor housing 108 except that it is a mirror image.

Referring back to FIGS. 2-5, provided between the stators 112 and 114 are discs 134 and 136 and a rotor assembly 138 mounted between the discs 134 and 136. As shown specifically in FIG. 7, disc 134 comprises an annular body 140 and a plurality of segments 142 inserted within the annular body 140. Each segment 142 generally corresponds in size and position to the teeth 118 of the stators 112 and 114. Additionally, the shape and position of the spaces 143 between the segments 142 are generally conformed to the shape and position of the teeth 118 in the stators 112 and 114.

Figure 7:
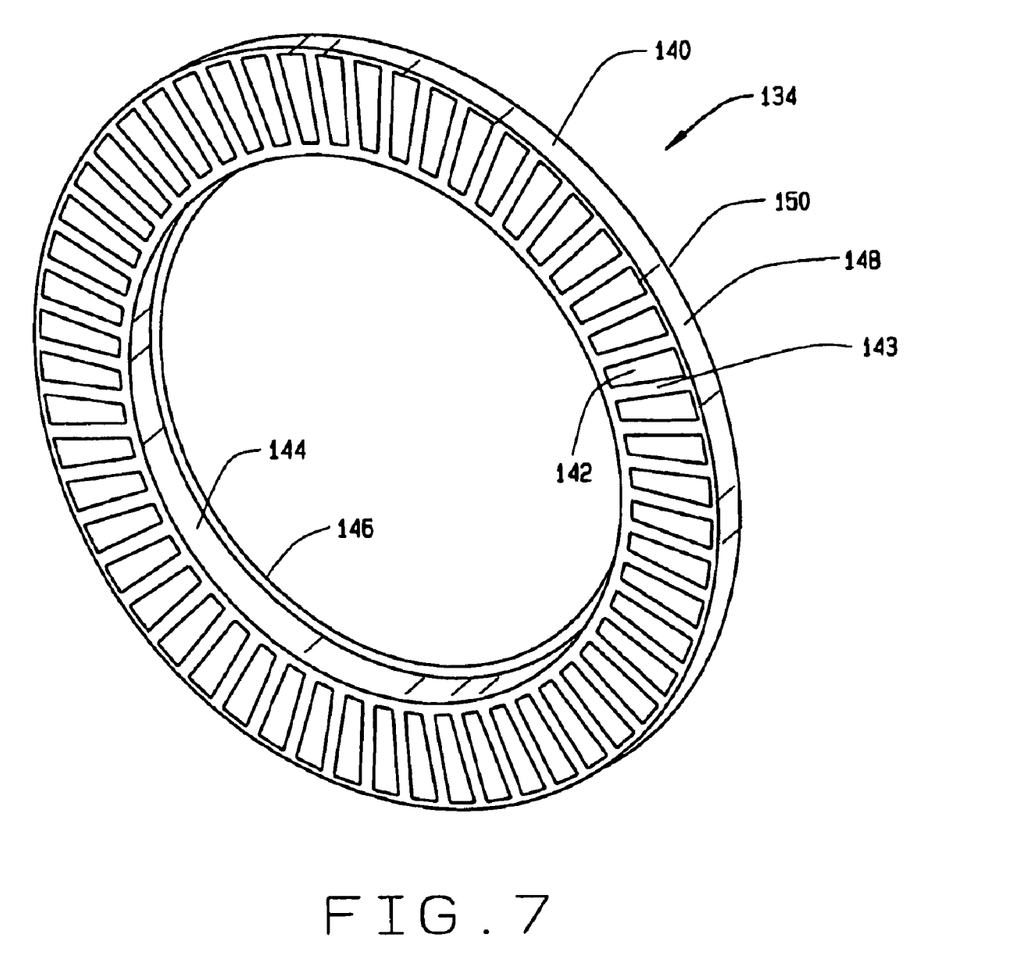
FIG. 7 is a perspective view of a field weakening disc of an electric motor in accordance with a preferred embodiment of the present invention.

The segments 142 preferably comprise a material of high magnetic permeability. The body portion 140 preferably is made from a material that has a relatively lower magnetic permeability. Alternatively, the body portion 140 could be made from a material with a magnetic permeability that is higher in relation to that of the segments 142. Ideally, the material used to construct the body portion 140 is a diamagnetic material having permeability slightly less than air.

The disc 134 comprises a cylindrical inner surface 144 having an inwardly extending annular rib 146 adjacent one face of the discs 134 and having an outer surface 148 that defines an annular recessed portion 150 adjacent the same face of the disc 134 as the inwardly extending annular rib 146. The disc 136 is identically constructed to the disc 134.

Referring back to FIGS. 2-5, the rotor assembly 138 comprises a rotor 152 having permanent magnets 154 placed in the rotor 152 near an outer periphery 156 of the rotor 152. The magnets 154 are alternatingly arranged such that adjacent magnets have their poles placed in opposite directions. The rotor assembly 138 further comprises a shaft 158 through a center of the rotor 152 and is attached thereto.

The motor 100 is assembled by attaching a ring gear 162 to the disc 134. The ring gear 162 comprises a plurality of grooves 164 in the outer periphery 166 of the ring gear 162 capable of mating with a worn gear 182. On an inner periphery 168 of the ring gear 162 are located two annular and inwardly extending ribs 170. The disc 134 is arranged such that it extends within the ring gear 162 until one of the ribs 170 of the ring gear 162 is received within the annular recessed portion 150 of the disc 134. Next, the rotor assembly 138 is placed within the ring gear 162 and adjacent the disc 134. The disc 136 is next placed adjacent the rotor assembly 138 within the ring gear 162 opposite the disc 134 in the same manner as the disc 132, i.e. such that the other of the ribs 170 is received within the annular recessed portion 150 of the disc 136. In this manner, the rotor assembly 138 is now captured between the discs 134 and 136 and within the ring gear 162.

To mount the rotor assembly 138 and the discs 134 and 136 to the motor 100, the first motor housing 108 with the stator 112 mounted therein is brought into proximity to the assembly of the rotor assembly 138 and the discs 134 and 136. The disc 134 is next mounted upon a bearing 172 placed about the disc bearing surface 126 and against the disc bearing stop wall 128 of the motor housing 108. The bearing 172 is further mounted within the cylindrical inner surface 144 and against the inwardly extending annular rib 146 of the disc 134.

The rotor assembly 138 is separately mounted within the motor housing 108 by mounting the shaft 158 within a bearing 174 mounted within the central bore 122 of the motor housing 108 and against a motor housing annular rib 176 formed in the motor housing 108.

Similarly, the motor housing 110 with the stator 114 mounted therein is brought into proximity to the assembly of the rotor assembly 138 and the discs 134 and 136. The disc 136 is next mounted upon a bearing 178 placed about the disc bearing surface 126 of the motor housing 110 and against the disc bearing stop wall 128 of the motor housing 110. The bearing 178 is further mounted within the cylindrical inner surface 144 and against the inwardly extending annular rib 146 of the disc 136. The rotor assembly 138 is separately mounted within the motor housing 110 by mounting the shaft 158 within a bearing 180 inserted within the central bore 122 of the motor housing 110 and against a motor housing annular rib 176 of the motor housing 110.

When so assembled, the discs 134 and 136 do not touch the rotor assembly 138 or the stators 112 and 114, but instead are separately rotatable upon their own bearings. The rotor assembly 138 is free to spin in order to drive the shaft 158 of the motor 110 to provide torque. Likewise, the disc 134 located between the rotor 152 and the stator 112 and the disc 136 located between the rotor 152 and the stator 114, may rotate as a single assembly and independently from the rotor 152 to change the position of the segments 142 in relation to the teeth 118 of the stators 112 and 114. Specifically, because the segments 142 of the discs 134 and 136, and the spaces between the discs 134 and 136, each generally correspond to the teeth 118 of the stators 112 and 114, the discs 134 and 136 may be rotated such that the segments 142 are directly in front of the teeth of the stators 112 and 114 or the spaces between the segments 142 of the discs 134 and 136 are directly in front of the teeth 118 of the stators 112 and 114.

Figure 9:
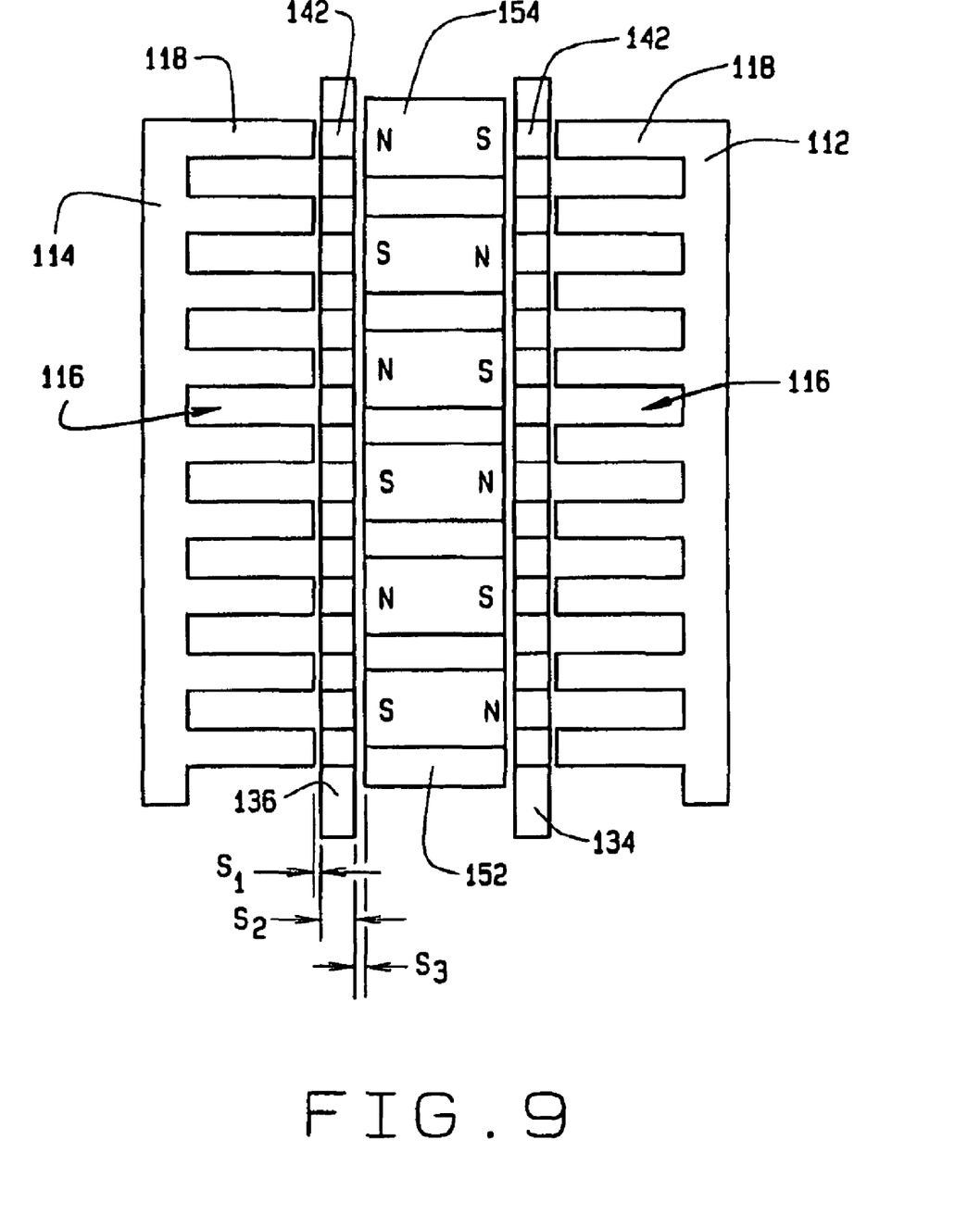
FIG. 9 is a diagram of an electric motor in accordance with a preferred embodiment of the present invention with a field weakening disc in a position to provide an unweakened field.

More specifically and referring to FIG. 9, the situation is illustrated where the segments 142, having high magnetic permeability, are lined up with the stator teeth 118. In this instance, the motor is operating under the normal condition with magnetic reluctance $Re_1$ between the magnets 154 and teeth 118 of the stators 112 and 114 determined by air gaps $S_1+S_2+S_3$, where $S_2$ is the effective air gap of the high permeability material formed by the segments 142. Because the segments 142 are highly magnetically permeable, the value of $S_2$ is very small.

Figure 10:
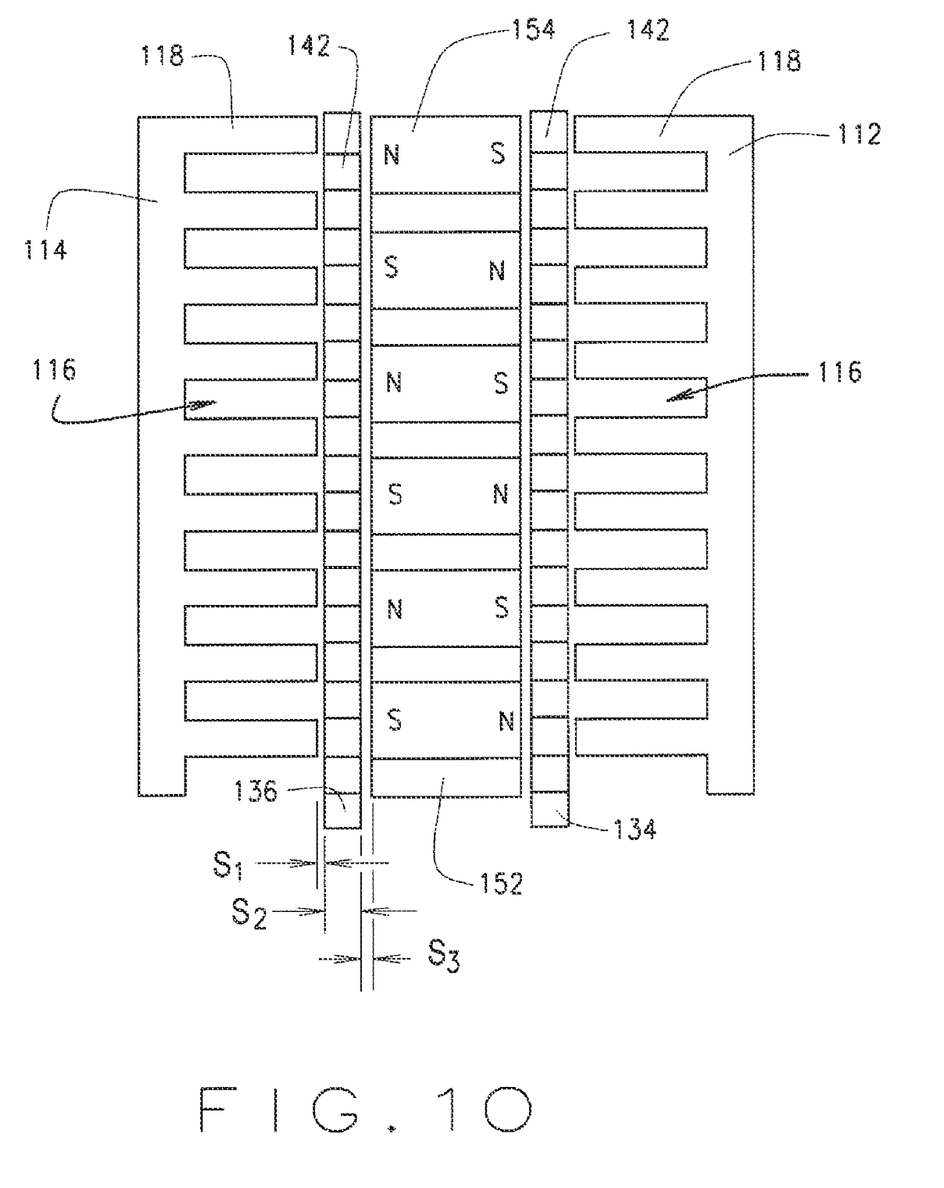
FIG. 10 is a diagram of an electric motor in accordance with a preferred embodiment of the present invention with a field weakening disc in a position to provide a weakened field.

FIG. 10 shows the situation where the actuator 106, under command from a control, rotates the discs 134 and 136 causing the segments 142 that have high magnetic permeability to become out of alignment with the stator teeth 118. In this instance, magnetic reluctance $Re_2$ between the magnets 154 and stator teeth 118 is defined by air gaps $S_1+S_2+S_3$, where $S_2$ is the effective air gap of the low permeability material formed by the disc body 134 or 136. Because the disc bodies 134 and 136 have relatively lower permeability than the segments 142, the effective value of $S_2$ in the instance of FIG. 10 is relatively larger than the instance of FIG. 9, and the reluctance $Re_2$ is noticeably higher than $Re_1$. Appreciable magnetic field weakening results for the electric motor 100 due to the larger effective air gap. When the high permeability material is aligned with the stator teeth 118, then the effective air gap is essentially $S_1+S_3$. When the low permeability material is aligned with the stator teeth 118, then the effective air gap is essentially $S_1+S_2+S_3$.

Figure 2:
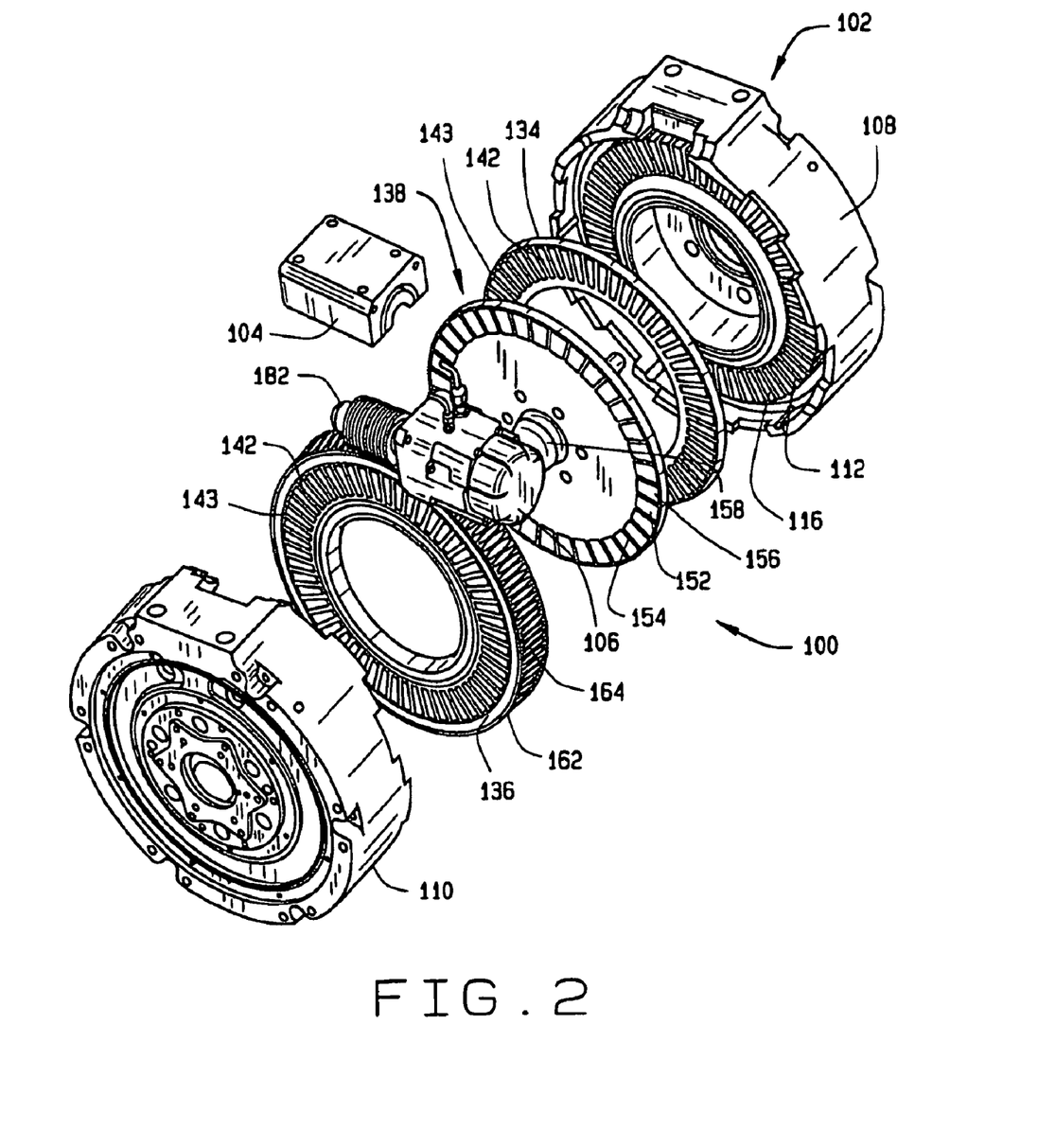
FIG. 2 is a front perspective exploded view of an electric motor in accordance with a preferred embodiment of the present invention.
Figure 3:
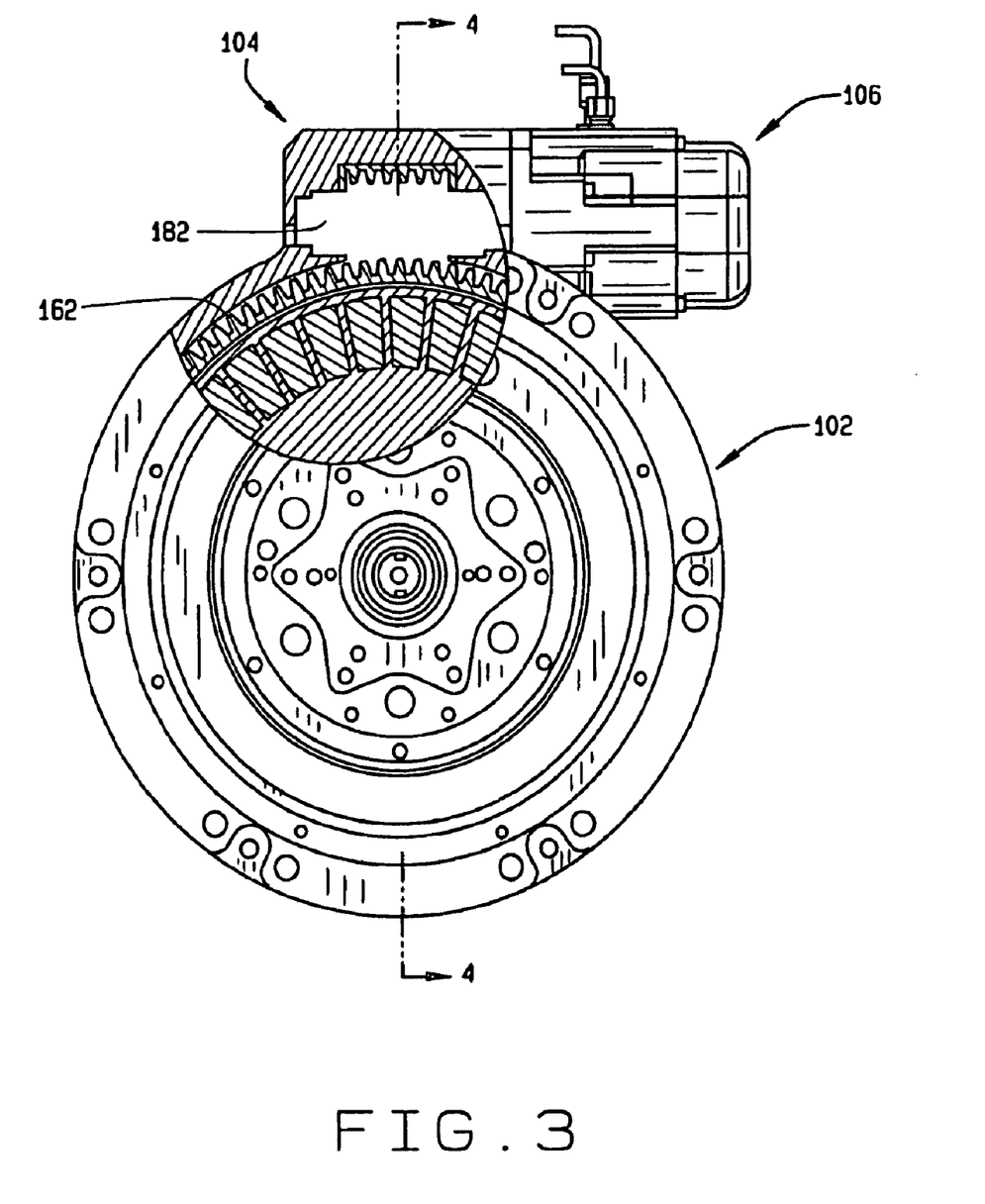
FIG. 3 is partial section end view of an electric motor in accordance with a preferred embodiment of the present invention.
Figure 4:
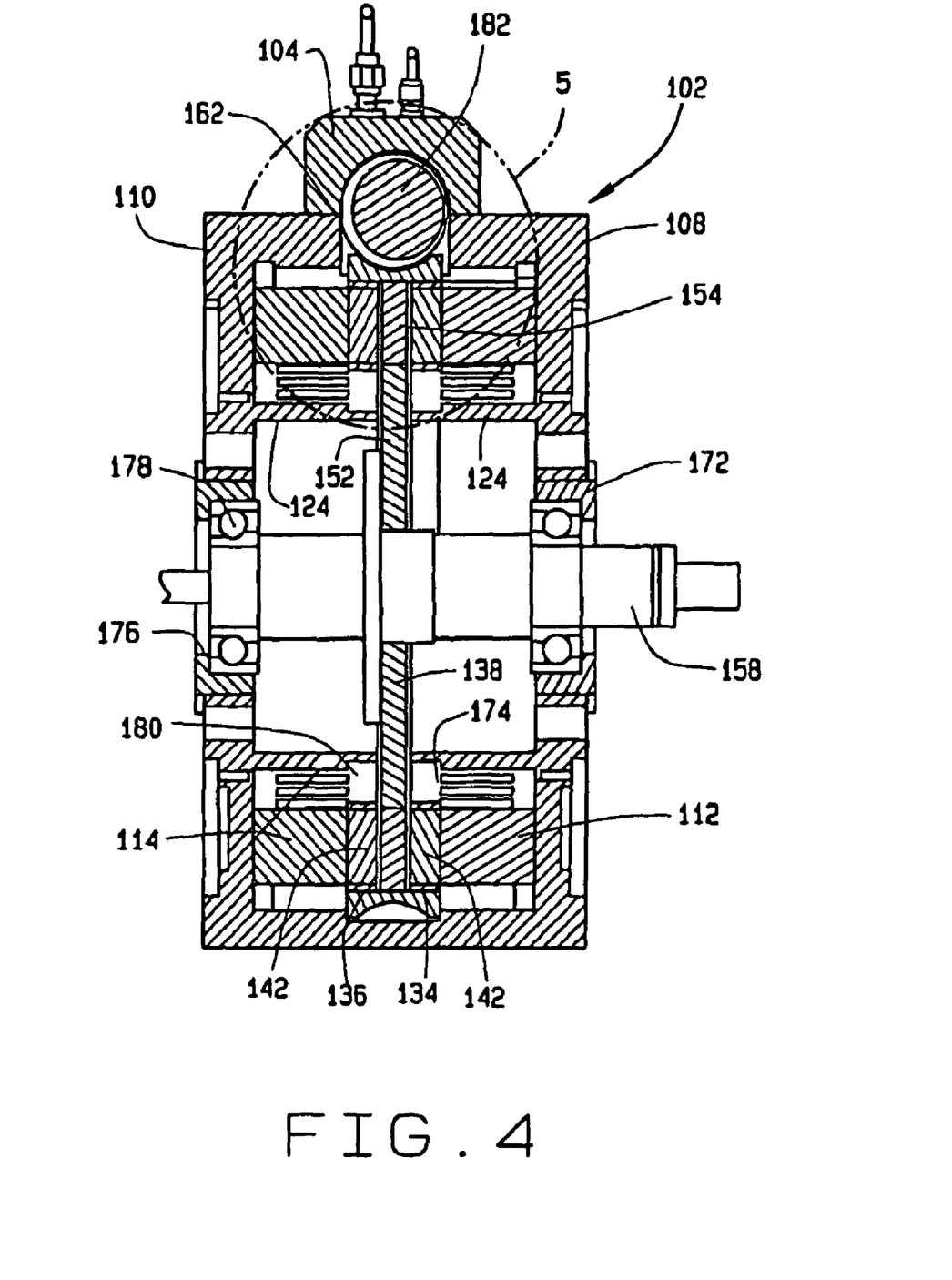
FIG. 4 is side section view taken along line A-A of FIG. 3.
Figure 5:
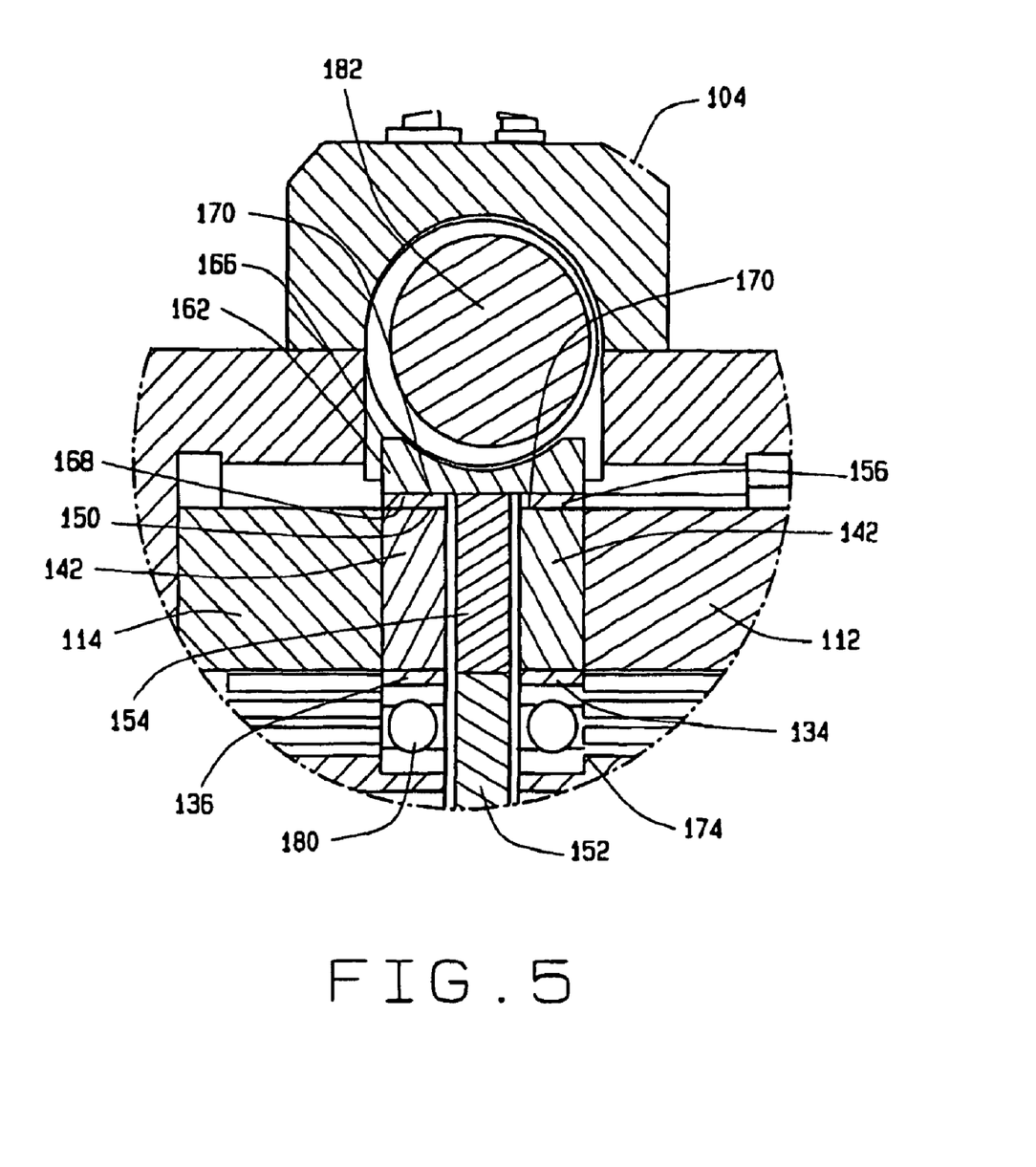
FIG. 5 is an enlarged section view of detail B of FIG. 4.

In the preferred embodiment, the assembly of the discs 134 and 136 and the ring gear 162 are rotated by the actuator 106 that is operating an actuator drive train 104. The actuator drive train 106 is preferably a worm drive comprising a worm gear 182 that mates with the grooves 164 in the outer periphery 156 of the ring gear 162. The actuator drive train 104 is supported through sliding bearings formed between the actuator drive train 104 and motor housings 108 and 110. While a worm drive comprises the preferred means of rotating the discs 134 and 136, any means could be used to rotate the discs, including but not limited to rack and pinion set with the rack actuated by a linear solenoid aligned in a direction perpendicular to motor rotor shaft or a cam mechanism actuated by a linear solenoid aligned in the same direction as the motor rotor shaft.

A control system operating the actuator 106 can optionally spin the actuator 106 in either direction or a single direction to provide the proper location of the segments 142 with respect to the teeth 118 of the stators 112 and 114. While it is contemplated that discs 134 and 136 will assume a position where the segments 142 are either located in front of the teeth 118 or where the space between the segments 142 are located in front of the teeth 118, it is envisioned that the control system may be implemented to operate the discs 134 and 136 in a more than two positions, such that infinite adjustment of the field weakening of the motor 100 may be possible.

While the specific embodiments have been illustrated and described, numerous modifications come to mind without significantly departing from the spirit of the invention, and the scope of protection is only limited by the scope of the accompanying claims.

The invention claimed is:

1. A variable speed and torque axial flux electric motor comprising:
 a rotor having a plurality of magnets mounted thereto about an axis;
 a stator axially adjacent said rotor having a plurality of slots defined therein, the slots defining raised teeth, the slots further wound with electrical wiring to generate a magnetic field when the wiring is energized with current; and
 a field weakening device comprising a highly magnetically permeable material and a comparatively lower magnetically permeable material, the device disposed axially between the rotor and the stator and is selectively adjustable about said axis between a first position to axially align the highly magnetically permeable material between the teeth of the stator and the magnets of the rotor for high-torque low-speed operation, and a second position to axially align the comparatively lower magnetically permeable material between the teeth of the stator and the magnets of the rotor for low-torque high-speed operation.

2. The electric motor of claim 1 wherein the field weakening device comprises a cylindrical body and the highly magnetically permeable material and the comparatively lower magnetically permeable material are alternately disposed along an axial end flat surface of the cylinder.

3. The electric motor of claim 1 wherein the field weakening device further comprises an actuator configured to selectively rotationally adjust the field weakening device about said axis to alternately align the highly magnetically permeable material or the comparatively lower magnetically permeable material in between the first and second positions.

4. The electric motor of claim 3 wherein the field weakening device comprises a cylindrical body having the highly magnetically permeable material and the comparatively lower magnetically permeable material alternately disposed along an axial end flat surface of the cylinder and wherein the actuator comprises an electric motor having a worm gear attached thereto, the worm gear mating with grooves of a ring gear associated with an outer diameter curved surface of the field weakening device.

5. The electric motor of claim 1 wherein the field weakening device comprises a disc made from the comparatively lower magnetically permeable material and having a plurality of segments of the higher magnetically permeable material inserted within the disc, each segment generally corresponding in size and position to teeth of the stator, the shape and position of spaces between the segments being also generally conformed to the shape and position of the teeth in the stator.

6. The electric motor of claim 1 wherein the field weakening device comprises a disc made from the high magnetically permeable material and having a plurality of segments of the comparatively lower magnetically permeable material inserted within the disc, each segment generally corresponding in size and position to teeth of the stator, the shape and position of spaces between the segments being also generally conformed to the shape and position of the teeth in the stator.

7. The electric motor of claim 1 wherein said field weakening device is infinitely adjustable between the first position where the highly magnetically permeable material is axially aligned between the teeth of the stator and the magnets of the rotor and the second position where the comparatively lower magnetically permeable material is axially aligned between the teeth of the stator and the magnets of the rotor.

8. An axial flux electric motor comprising:
 a rotor having a plurality of magnets mounted thereto about an axis;
 a stator adjacent said rotor having a plurality of slots defined therein, the slots defining raised teeth, the slots further wound with electrical wiring to generate a magnetic field when the wiring is energized with current; and
 a field weakening device comprising a highly magnetically permeable material and a comparatively lower magnetically permeable material, the device axially disposed between the rotor and the stator and configured with an actuator for rotational movement about said axis anywhere between a first position to axially align the highly magnetically permeable material between the teeth of the stator and the magnets of the rotor and a second position to axially align the comparatively lower magnetically permeable material between the teeth of the stator and the magnets of the rotor, the field weakening device comprising a cylindrical body having the highly magnetically permeable material and the comparatively lower magnetically permeable material alternately disposed along at least one axial face of the cylinder.

9. The electric motor of claim 8 wherein said cylindrical body is defined by a disc made from the highly magnetically permeable material, and wherein the comparatively lower magnetically permeable material is alternately disposed as segments incorporated into the highly magnetically permeable material along said at least one axial face.

10. The electric motor of claim 8 wherein said cylindrical body is defined by a disc made from the comparatively lower magnetically permeable material, and wherein the high magnetically permeable material is alternately disposed as segments incorporated into the comparatively lower magnetically permeable material along said at least one axial face.

11. The electric motor of claim 8 wherein the actuator comprises an electric motor having a worm gear attached thereto, the worm gear mating with grooves of a ring gear associated with an outer diameter surface of the field weakening device.

12. The electric motor of claim 8 wherein said field weakening device is infinitely rotationally adjustable about said axis between the first position where the highly magnetically permeable material is between the teeth of the stator and the magnets of the rotor and the second position where the comparatively lower magnetically permeable material is between the teeth of the stator and the magnets of the rotor.

13. The electric motor of claim 8 wherein said field weakening device is selectively adjustable to either the first position where the highly magnetically permeable material is between the teeth of the stator and the magnets of the rotor or the second position where the comparatively lower magnetically permeable material is between the teeth of the stator and the magnets of the rotor.

14. The electric motor of claim 8 wherein the motor comprises a second stator disposed on an axially opposite side of the rotor from the first stator and further comprises a second field weakening device disposed between the rotor and the second stator.

15. The electric motor of claim 14 wherein the second field weakening device is rotationally adjustable about said axis from a first position to a second position by the actuator.

16. The electric motor of claim 14 wherein the second field weakening device is rotationally adjustable about said axis from a first position to a second position by a second actuator.

17. The electric motor of claim 14 wherein said first and second field weakening devices are independently adjustable about said axis between first and second positions.

* * * * *